Dec. 3, 1935.                A. J. COBHAM                2,023,310

APPARATUS FOR REFUELING AIRCRAFT IN THE AIR

Filed Jan. 25, 1935

Patented Dec. 3, 1935

2,023,310

UNITED STATES PATENT OFFICE

2,023,310

APPARATUS FOR REFUELING AIRCRAFT IN THE AIR

Alan John Cobham, London, England, assignor to Alan Cobham Aviation Limited, London, England Application January 25, 1935, Serial No. 3,509
In Great Britain February 6, 1934

4 Claims. (Cl. 244—1)

This invention relates to the refueling of an aircraft in the air by transfer of fuel to it from another aircraft. The most difficult and dangerous part of the refueling operation is the making of contact between the receiving aircraft and the supply aircraft. Hitherto this has been done by suspending a cord or the like weighted with a heavy object benath one of the aircraft, leaving it to the pilot of the other aircraft so to judge his approach to the first mentioned aircraft that he is able to catch the weight in his hand. Then, after the two aircraft have manœuvred into suitable positions relatively to one another, an operator on the receiving aircraft is able to draw a fuel pipe across the space between the two aircraft by pulling on the cord, and connect the pipe to the fuel tanks of the receiving aircraft.

It is found, however, that this procedure is a dangerous one since if the pilot of the aircraft which is to pick up the cord misjudges his approach to the weight he may fail to catch the latter with the result that the weight may become entangled with some vulnerable part of his machine, such as the rudder, ailerons or propeller, and so lead to disaster.

According to the present invention, this difficulty is overcome by weighting the cord with a bag containing liquid (e. g. water). The advantage of using a bag containing liquid as the weight is that the bag will be sufficiently heavy to maintain a steady position relatively to the aircraft which is to pick up the cord and yet it will be fragile enough to break and discharge its contents if it should accidentally catch up in some vulnerable part of that aircraft.

In the preferred form of the invention the bag is constituted by a rubber balloon filled with water, but it will be appreciated that the bag may be made of other material, e. g. of thin silk fabric or even of thin glass or celluloid, and that other liquids besides water may ge used if desired (e. g. mercury).

The cord may be trailed beneath the supply aircraft, in which case the pilot of the receiving aircraft sets his course directly on the bag and flies straight towards it. It is found that it is a comparatively simple matter for a skilled pilot (or other member of the crew) to catch the bag. After the bag has been caught the pilot manœuvres into a position higher than that in which he caught the bag and somewhat to the rear of and to one side of and below the level of the tail of the supply aircraft. By pulling on the cord a fuel pipe is drawn over from the supply aircraft to the receiving aircraft, and after making the necessary connections the fuel transfer operation can commence. During the fuel transfer operation it is preferred that the fuel pipe should hang in a loop between the two aircraft, so that if it should break neither aircraft will be injured.

If, however, it is desired to refuel an air liner without disturbing its flight or causing it to change its course, the cord weighted by the liquid filled bag is trailed below the air liner, preferably from a cockpit at the tail end thereof. When the cord has been picked up by the supply aircraft, the latter manœuvres into a position above and to the rear of the air liner, the cord is connected to a fuel pipe, and the fuel pipe drawn over to the air liner by pulling on the cord.

The invention provides means whereby once a contact has been established between the two aircraft by means of the cord, such contact will be maintained in spite of considerable changes in the relative positions of the two aircraft.

It has hitherto been the practice to draw the slack of the cord into the interior of the cockpit of the lower aircraft either hand over hand or by means of a winch. According to the invention, however, the cord weighted by the liquid-filled bag is allowed to pass (preferably between guides) over the side of the lower aircraft where it takes up the normal angle of trail and provides a continuous and unentangled connection which may be paid out should the distance between the two aircraft suddenly increase, or may be allowed to fall below the lower aircraft either by manual assistance or by its own weight, should the distance between the two aircraft suddenly decrease. Even if it is necessary to disconnect the fuel pipe and interrupt the refueling operation due to a sudden separation of the two aircraft, the contact by means of the cord will still be maintained and it will be possible to re-establish the pipe line connection by pulling on the cord, when the two aircraft have been manœuvred close enough for the refueling to be resumed.

Two methods of carrying the invention into practice are illustrated by way of example in the accompanying diagrammatic drawing.

In the drawing Figs. 1 to 4 represent the relative positions adopted by the two aircraft when the liquid filled bag is suspended beneath the supply aircraft.

Figure 5:
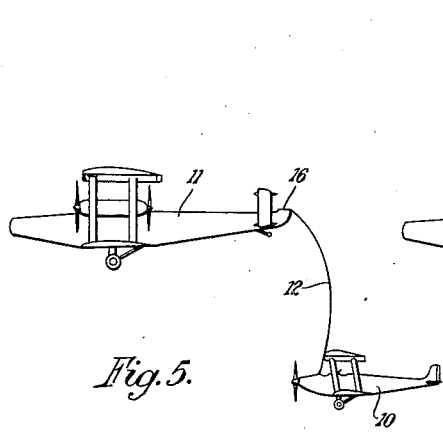
Figs. 5 and 6 are side views of the relative positions adopted by the two aircraft when the liquid filled bag is trailed beneath the receiving aircraft.
Figure 6:
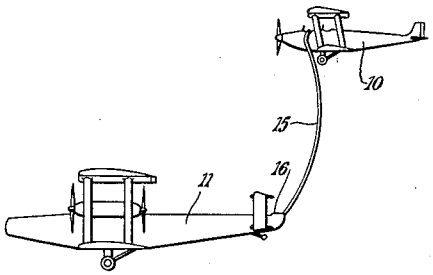

In Fig. 5 the bag has just been picked up and in Fig. 6 the pipe line has been drawn across from the supply aircraft to the receiving aircraft.

The first method is illustrated in Figs. 1 to 4, of which:—

Figure 1:
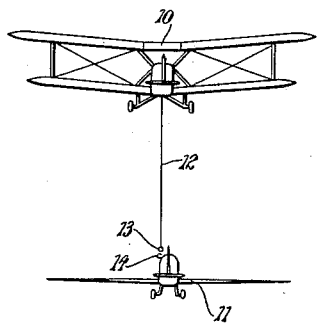
Figs. 1 and 2 are rear views of the two aircraft showing their relative positions at the moment of grasping of the bag and after the bag has been grasped, respectively.

Fig. 1 is a rear view of the two aircraft showing their positions at the moment of grasping the liquid-filled bag, 10 representing the supply aircraft, 11 the receiving aircraft, and 12 the cord which is suspended beneath the supply aircraft and weighted by the liquid-filled bag 13.

Figure 2:
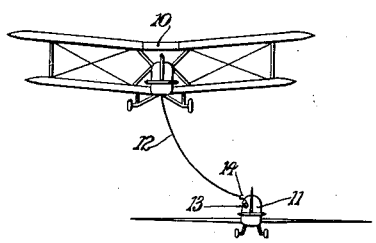

Fig. 2 is a rear view indicating the position which is preferably taken up by the receiving aircraft as soon as the bag 13 has been grasped by the pilot or other member of the crew of the lower aircraft.

Figure 3:
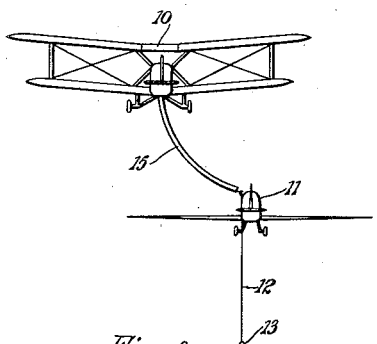
Fig. 3 is a rear view, and Fig. 4 the corresponding side view of the positions adopted by the aircraft after the pipe line has been drawn across from the supply aircraft to the receiving aircraft.

Fig. 3 is a rear view of the two aircraft after the fuel pipe 15 has been almost pulled in by the operator in the receiving aircraft, the cord 12 and liquid-filled bag 13 having been passed down to trail in a position below the receiving aircraft, the cord passing through the guide 14 carried on the side of the receiving aircraft 11.

Figure 4:
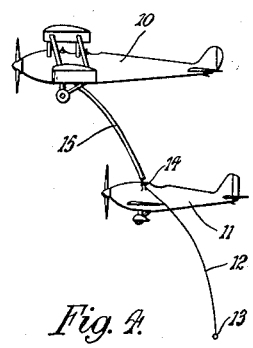

Fig. 4 is a side view of the aircraft shown in Fig. 3, indicating the relative position of the two machines in a vertical plane in the line of flight.

From Fig. 3 it will be appreciated that should it for any reason become necessary for the operator in the lower machine suddenly to release both the fuel pipe 15, the cord 12 and liquid-filled bag 13, owing to the fact that the lower machine is not in proper relationship to the upper machine, he will be able to disengage the cord from the guide 14, so that the cord and fuel pipe will trail beneath the upper machine without fouling any part of the lower machine. The tail plane of the lower machine may, if necessary, be guarded by a deflector rod or cable (not shown) so as to cause the pipe or cable to slide to the rear of the lower machine without becoming entangled with the empenage.

The other method is shown in Figs. 5 and 6. In this case, fuel is to be transferred to an air liner 11 from a tanker 10 without interfering with the journey of the air liner. The cord 12, weighted as before with a liquid-filled bag (not shown) is trailed from a cockpit 16 at the tail end of the air liner. Fig. 5 shows the state of affairs imediately after the cord has been picked up by the tanker 10. The tanker then manœuvres into the position shown in Fig. 6, whereupon the crew of the air liner draw the pipe line 15 across from the tanker to the air liner by pulling on the cord 12. As will be seen in Fig. 6, the pipe line 15 extends from the case of the tanker 10 10 to the cockpit 16 in the tail of the air liner 11, where the fuel is transferred to a pipe leading to the fuel tanks of the air liner.

What I claim as my invention and desire to secure by Letters Patent is:—

1. Means for establishing communication between two aircraft for the purpose of effecting a transfer of fuel from one to the other in the air, comprising in combination with one of the aircraft a bag containing liquid, and a flexible suspension interconnecting the bag and the aircraft, so that the bag is trailed beneath the aircraft in position to be picked up by the pilot of the other aircraft.

2. Means for establishing communication between two aircraft for the purpose of effecting a transfer of fuel from one to the other in the air, comprising in combination with one of the aircraft a rubber balloon containing water, and a flexible suspension interconnecting the balloon and the aircraft so that the balloon is trailed beneath the aircraft in position to be picked up by the pilot of the other aircraft.

3. Means for transferring fuel during flight from a supply aircraft to a receiving aircraft, comprising a hose located within the supply aircraft and adapted to be coupled to a tank in the receiving aircraft, a bag containing liquid, and a flexible suspension interconnecting the hose and the bag and adapted to be trailed beneath the supply aircraft with the bag in position to be picked up by the pilot of the receiving aircraft.

4. Means for transferring fuel during flight from a supply aircraft to a receiving aircraft, comprising a hose located within the supply aircraft and adapted to be coupled to a tank in the receiving aircraft, a rubber balloon containing water, and a flexible suspension interconnecting the hose and the balloon and adapted to be trailed beneath the supply aircraft with the balloon in position to be picked up by the pilot of the receiving aircraft.

ALAN JOHN COBHAM.